H. Harris,
Snap Hook,
No. 46,796. Patented Mar. 14, 1865.

Witnesses:
Wm. Griswold,
James L. Bowen.

Inventor:
Horace Harris.

UNITED STATES PATENT OFFICE.

HORACE HARRIS, OF NEWARK, NEW JERSEY.

HARNESS-SNAP.

Specification forming part of Letters Patent No. 46,796, dated March 14, 1865; antedated March 1, 1865.

*To all whom it may concern:*

Be it known that I, HORACE HARRIS, of the city of Newark, in the county of Essex and State of New Jersey, have invented an Improvement in the Mode of Constructing Harness Snaps; and I do hereby declare that the following is a full and exact description of the same, reference being had to accompanying drawings and to the letters marked thereon.

The nature of my invention consists in the mode of attaching the spring to the hook of a harness-snap.

Figure 2:
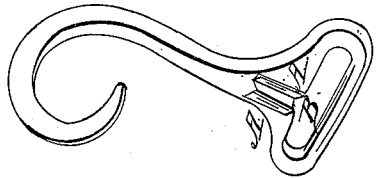
Figure 3:
Figure 1:
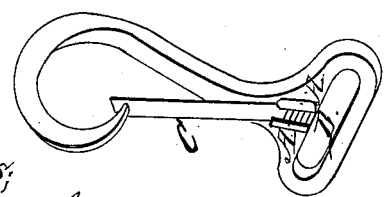

The hook is made with lips A A (see Figure 1) thrown up at the sides of the recess B, into which the spring C, corrugated or notched at the back end, D, Fig. 2, is laid. The lips then being riveted down over the corrugated end of the spring D, (see Fig. 3,) hold it positive, without the liability of loosening in use.

I am aware that hooks have been made and springs riveted in as in my device, but without my improvement of ridging the end of the spring there has been a difficulty of keeping it from working after being used awhile. This my invention perfectly prevents.

My improvement contains two important advantages—first, the spring is much stronger than when riveted with a hole through it; second, the expense of manufacturing is very considerably lessened.

I claim—

The mode herein described of preparing the back end of the spring D to be attached to the hook E, substantially in the manner specified.

HORACE HARRIS.

Witnesses:
WM. GRISWOLD,
JAMES L. BOWEN.